United States Patent [19]

Suzuki

[11] Patent Number: 5,708,968

[45] Date of Patent: Jan. 13, 1998

[54] CHANNEL SEGREGATION METHOD

[75] Inventor: Hiroshi Suzuki, Yokosuka, Japan

[73] Assignee: Nippon Mobile Communications, Tokyo, Japan

[21] Appl. No.: 530,194

[22] PCT Filed: Jun. 9, 1995

[86] PCT No.: PCT/JP95/01155

§ 371 Date: Oct. 2, 1995

§ 102(e) Date: Oct. 2, 1995

[87] PCT Pub. No.: WO95/35640

PCT Pub. Date: Dec. 28, 1995

[30] Foreign Application Priority Data

Jun. 22, 1994 [JP] Japan ........................ 7-140338

[51] Int. Cl.$^6$ ........................ H04Q 7/00; H04Q 9/00
[52] U.S. Cl. ........................ 455/34.1; 455/34.2; 455/56.1; 455/62
[58] Field of Search ........................ 455/34.1, 33.1, 455/34.2, 54.1, 54.2, 56.1, 62, 63, 67.1

[56] References Cited

U.S. PATENT DOCUMENTS

| | | | |
|---|---|---|---|
| 5,179,722 | 1/1993 | Gunmar et al. | 455/33.1 |
| 5,285,447 | 2/1994 | Hulsebosch | 455/54.2 |
| 5,293,640 | 3/1994 | Gunmar et al. | |
| 5,367,533 | 11/1994 | Schilling | |
| 5,386,589 | 1/1995 | Kanai | |
| 5,448,761 | 9/1995 | Ushirokawa | 455/62 |
| 5,507,007 | 4/1996 | Gunmar et al. | 455/63 |
| 5,507,008 | 4/1996 | Kanai et al. | 455/54.1 |

*Primary Examiner*—Reinhard J. Eisenzopf
*Assistant Examiner*—Gertrude Arthur

[57] ABSTRACT

The minimum CIR value that permits a channel allocation to a call is defined as a threshold value $\Lambda_{c1}$ and a CIR value a little larger than it is defined as a threshold value $\Lambda_{c2}$. The CIR value in each idle channel is measured. When the measured CIR value is below the threshold value $\Lambda_{c1}$, the priority of that channel is decreased; when the CIR value is between the threshold values $\Lambda_{c1}$ and $\Lambda_{c2}$, the priority is increased; and when the CIR value is above the threshold value $\Lambda_{c2}$, the priority is held unchanged. When a call occurs in a base station, the highest-priority one of idle channels with the CIR values larger than the threshold value $\Lambda_{c1}$ is allocated to that call and the priority of the allocated channel is increased.

10 Claims, 6 Drawing Sheets

CHANNEL STATE TABLE

|  | $CH^1$ | $CH^2$ | $CH^3$ | - - - - - - | $CH^K$ |
|---|---|---|---|---|---|
| $\hat{\Lambda}$ (or $\hat{W}$) |  |  |  |  |  |
| $P_m^k$ |  |  |  |  |  |
| STATE OF USE |  |  |  |  |  |

PRIOR ART

FIG. 3

PRIOR ART

FIG. 4A

PRIOR ART

PRIOR ART

CHANNEL SEGREGATION METHOD

TECHNICAL FIELD

The present invention relates to a channel segregation method for mobile communications that is applied to a channel allocation control system using an autonomous distributed control scheme based on the priority of each channel and updates the priority in accordance with a CIR value measured or power received for each channel to thereby segregate usable channels among cells.

PRIOR ART

To enhance the frequency utilization efficiency in mobile communications, there have been employed a narrow-band modulation-demodulation technique, a multiple-channel access technique and a spatial-reuse-of-the-same-frequency technique. Among others, the spatial reuse of frequency is a technique indispensable to the construction of a large-scale system that has a wide coverage area (Flenkiel, R. H., "A high-capacity mobile radiotelephone system model using coordinated small-zone approach," IEEE Trans. on Vehic. Tech., vol. VT-19, pp. 173–177, May 1970). A lot of study has been carried out to provide increased efficiency in spatial frequency reuse; there is known, for example, a method that partitions cells in the form of a ring to improve the efficiency of frequency reuse at the center of the ring (Halpern, S. W., "Reuse partitioning in cellular systems," Digest of 33rd IEEE Vehic. Tech. Conf., pp. 322–327, May 1983).

According to these conventional methods, available channels are preliminarily allocated to each cell. This involves complicated work of measuring the level of interference with each cell over the entire service area and allocate an optimum channel to the base station of each cell according to the measured results. In future mobile communications, it is particularly important to reduce the area of each cell so as to increase the number of subscribers, and it is expected that the resulting increase in the number of cells and complexity of radio wave propagation paths will make it very much difficult to allocate the channel to each cell adequately.

In view of the above, a detailed analysis is being made of a dynamic channel assign technique that allows respective cells to share all or some of channels and allocate or use them according to the circumstances (Beck, R., H. Panzer, "Strategies for handover and dynamic allocation in micro-cellular mobile radio systems," Digest of 39th IEEE Vehic. Tech. Conf., pp. 178–185, May 1989). This technique, however, has a disadvantage that if such channel control is effected, as in the past, by a switching center that unifiedly controls all base stations within the service network, a large amounts of information processing and a large-scale control communication network will be needed.

As a solution to this problem, there is now being studied a channel segregation scheme that each base station autonomously performs the channel allocation (Furuya, Y. and Y. Akaiwa, "Channel segregation, a distributed adaptive channel allocation scheme for mobile communication systems," IEICE Trans., vol. E74, pp. 1531–1537, June 1991). This scheme will be described below in brief.

Now, assume that K channels $CH^1$ to $CH^k$ are allocated to the entire mobile communication system of the service area, that the number of aLL cells $C_1$ to $C_M$ in the service area is M and that the base station $B_m$ (where m is an integer in the range of 1 to M) of each cell in the service area has a capability of using any of the channels $CH^1$ to $CH^k$. Furthermore, let it be assumed that the m-th base station $B_m$ has priority $P_m^k(i)$ on the k-th channel $CH^k$, where k is an integer in the range of 1 to K and i represents discrete times 1, 2, 3, .... Moreover, suppose that the receiver of each base station $B_m$ is capable of measuring received power in each channel. In a mobile communication system the transmitting power is controlled so as to be a constant received power as a desired wave at each base station, and the power that is received in each cell in each channel when no desired wave is being transmitted represents the power of an interference wave from another cell. Since the received power of the desired wave is made constant, it is possible to calculate, from the magnitude of measured interference-wave power, a carrier power versus interference-wave power ratio (CIR) $\Lambda$ in each channel. Letting a CIR threshold value at which speech quality cannot be maintained be represented by $\Lambda_c$, a channel wherein $\Lambda < \Lambda_c$ is not assigned to a call (terminated or not originated) in each base station. With this method, each base station $B_m$ has its priorities $P_m^1(i)$ to $P_m^k(i)$ defined on all the channels $CH^1$ to $CH^k$, respectively, and updates the priorities by the procedure described below. Since all the base stations utilizes the same procedure, the description will be given of only one base station $B_1$.

(A) Updating by idle channel scanning

Each base station $B_m$ regularly scans all idle channels in a constant time interval (of several seconds, for example), measures the interference level (that is, the power of an interference wave received from another cell when no desired signal is being sent in the cell of the base station) and writes into a memory the interference-wave received level $W_k$ corresponding to each channel $CH^k$ or the CIR value $\Lambda_k$ calculated therefrom. Furthermore, the priority $P_m^k(i)$ on the channel $CH^k$ is defined by the following equation:

$$P_m^k(i) = \{(i-1)P_m^k(i-1) + q(\Lambda_k)\}/i \qquad (1)$$

Figure 3:
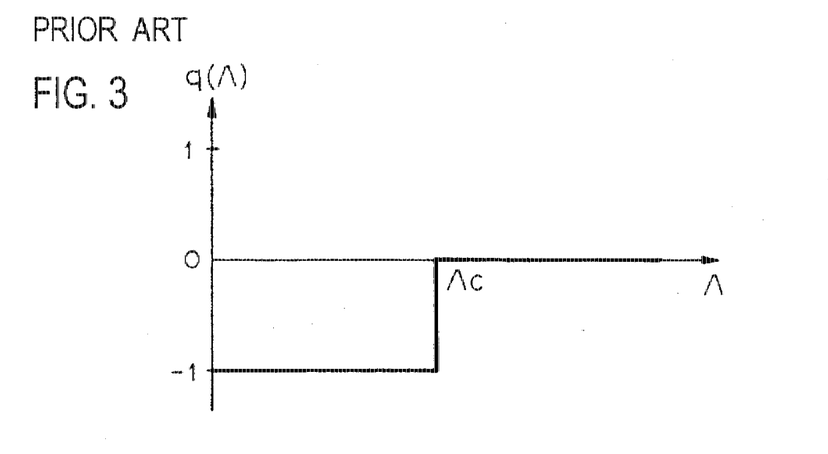
FIG. 3 is a graph showing a priority increasing/decreasing function $q(\Lambda)$ used in the prior art.

The priority on each channel represents a degree of the channel use (the number of times the channel is used per unit time); $(i-1)P_m^k(i-1)$ in Eq. (1) indicates the number of times the channel is used from a certain reference time 0 to a time immediately before the current time (i-1). That is, the updating of the priority expressed by Eq. (1) means that a value obtained by adding $q(\Lambda_k)$ to the total number of times the channel was used from the reference time 0 to the immediately preceding time (i-1) is divided by time i to update the priority. The value $q(\Lambda_k)$ is one that is dependent on the CIR value $L_k$ of the k-th channel $CH^k$ and, as shown in FIG. 3, it is −1 or 0, depending on whether the measured value $\Lambda_k$ is smaller or larger than the threshold value $\Lambda_c$. In the following description, the CIR value $\Lambda_k$ will sometimes be denoted merely as $\Lambda$, omitting the suffix k. When the interference-wave received level $W_k$ of the k-th channel $CH^k$ is above a certain value, that is, when the CIR value $\Lambda$ of the k-th channel $CH^k$ is below the CIR threshold value $\Lambda_c$, the priority $P_m^k(i)$ of Eq. (1) is decreased by setting $q(\Lambda)=-1$. That is to say, the priority $P_m^k(i)$ is updated by the following equation:

$$P_m^k(i) = \{(i-1)P_m^k(i-1) - 1\}/i \qquad (2)$$

Let it be assumed here that the desired wave received level in each base station of the mobile communication system is controlled to be a fixed value as mentioned previously. Accordingly, the CIR value $\Lambda$ on the abscissa in FIG. 3 a value that is determined by the received interference wave power of the channel concerned; being small in the CIR value $\Lambda$, that is, being large in the received interference wave power indicates that the interference wave source is near (an adjacent cell, for instance), whereas being large in the CIR value $\Lambda$ indicates that the interference wave source is distant.

In the case of FIG. 3, the value $\Lambda$ in the range from 0 to $\Lambda_c$ can be considered to be the CIR value based on the interference wave from an adjacent cell and the value larger than $\Lambda_c$ can be considered to be the CIR value based on the interference wave from a cell farther than the adjacent one.

When th value $\Lambda$ is larger than $\Lambda_c$, $q(\Lambda)=0$; hence, the priority remains the same as in the previous scanning as given by the following equation and the priority $P_m^k$ is not updated.

$$P_m^k(i)=P_m^k(i-1) \qquad (3)$$

The updating of priority by Eqs. (2) and (3) is carried out with respect to idle ones of the channels $CH^1$ to $CH^k$ at regular time intervals as referred to previously and the CIR value is stored into the memory of the receiver in the base station $B_m$ in correspondence with the channels $CH^1$ to $CH^k$ as depicted in the channel state table of FIG. 2.

(B) Updating accompanying call processing

Figure 1:
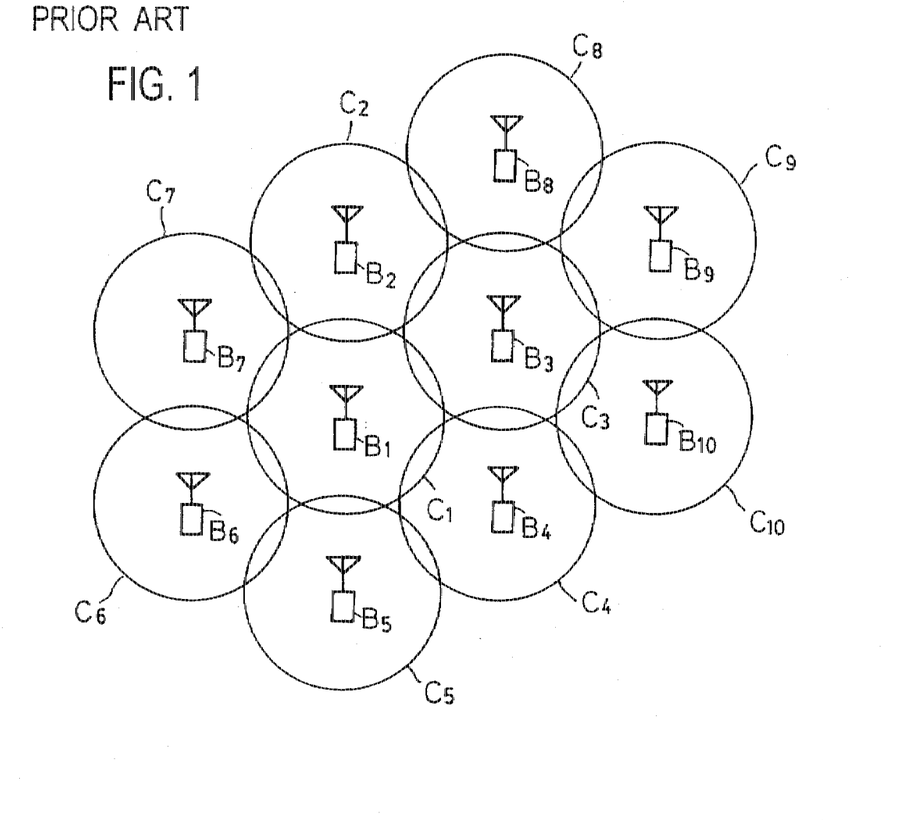
FIG. 1 is a diagram showing the positioning of cells in the service area of a mobile communication system.
Figure 2:
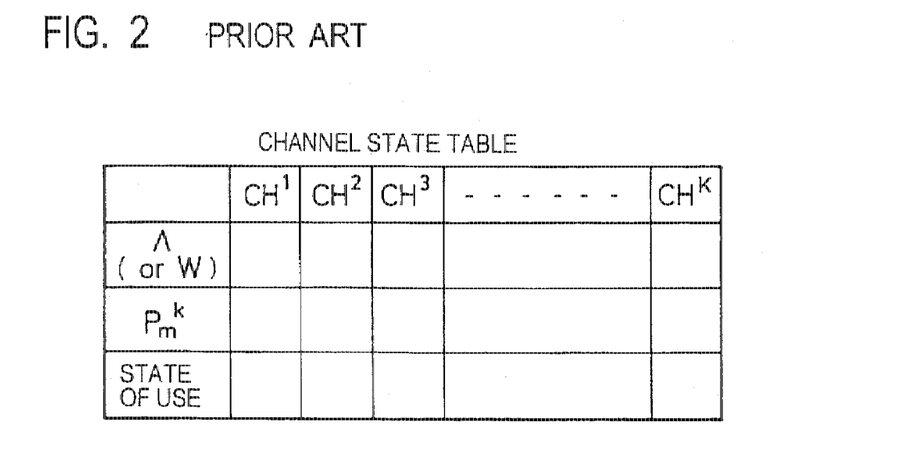
FIG. 2 is a table showing the states of respective channels.

When a call occurs in each base station $B_m$, the channels are searched in the order of descending priorities $P_m^k$ stored in the table of FIG. 2 and the channel whose read-out CIR value $\Lambda$ is larger than the threshold value $\Lambda_c$ and which is currently idle in the base station $B_m$ is allocated to the call. The priority $P_m^k(i)$ of the channel thus allocated is increased through calculation by the following equation to update the value of the corresponding priority $P_m^k$ in the table of FIG. 2.

$$P_m^k(i)=\{(i-1)P_m^k(i-1)+1\}/i \qquad (4)$$

With such a control scheme, the priority of the channel that is used often is increased, and hence it is used with higher frequency. As for the channel that is not much used, the frequency with which it interferes with the base station of an adjacent cell is decreased—this increases the frequency with which it is used in the base station of the adjacent cell. In consequence, the frequency of interference from the base station of the adjacent cell in that channel goes up, further decreasing the priority of that channel and hence decreasing the frequency of use accordingly. Since processing like this is autonomously performed in each of the base stations $B_1$ to $B_M$, channels are efficiently segregated among the cells $C_1$ to $C_M$.

Figure 4A:
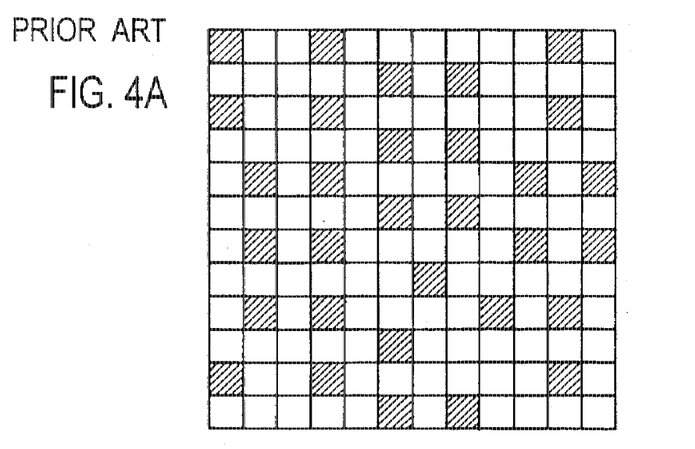
FIG. 4A is a diagram showing an example of a channel segregation converence pattern in the prior art.

FIG. 4A shows, by way of example, the results of computer simulations done on the segregation of channels. In the simulations, each cell is represented as a square and the entire system is assigned $K=12$ channels. The foregoing example has been described in respect of the case where each cell has in its base station a transmitter-receiver capable of using $K=12$ channels, but in practice, the CIR value $\Lambda$ of the channel $CH^k$ alocated to a call in a cell adjacent a certain cell $C_m$ becomes smaller than the threshold value $\Lambda_c$ in the cell $C_m$; hence, when the channels are completey segregated as predetermined, it does not matter, in effect, that the maximum number $L_b$ of channels simultaneously usable in each cell is selected smaller than K. Then, it is sufficient, in practice, that the base station of each cell be provided with $L_b$ transmitter-receivers of a number smaller than K. In this instance, however, the $L_b$ transmitter-receivers are each capable of setting the K channels $CH^1$ to $CH^k$. It was conditioned that the carrier in the channel $CH^k$ sent from the cell $C_m$ was received as an interference wave by the adjacent cell and that the CIR value $\Lambda$ of the channel $CH^k$ in the adjacent cell became smaller than the threshold value $\Lambda_c$; hence the same channel $CH^k$ could not be used in eight cells adjoining the cell $C_m$. In FIG. 4A there are indicated by hatching those cells whose priorities $P_m^k(i)$ on one channel $CH^k$ are higher than a certain value.

Figure 4B:
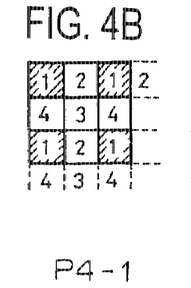
FIG. 4B is a diagram showing a four-cell reuse unit pattern in FIG. 4A.
Figure 4C:
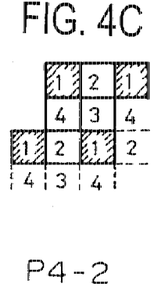
FIG. 4C is a diagram showing another four-cell reuse unit pattern in FIG. 4A.
Figure 4D:
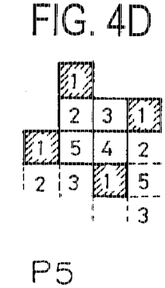
FIG. 4D is a diagram showing a five-cell reuse unit pattern in FIG. 4A.
Figure 5:
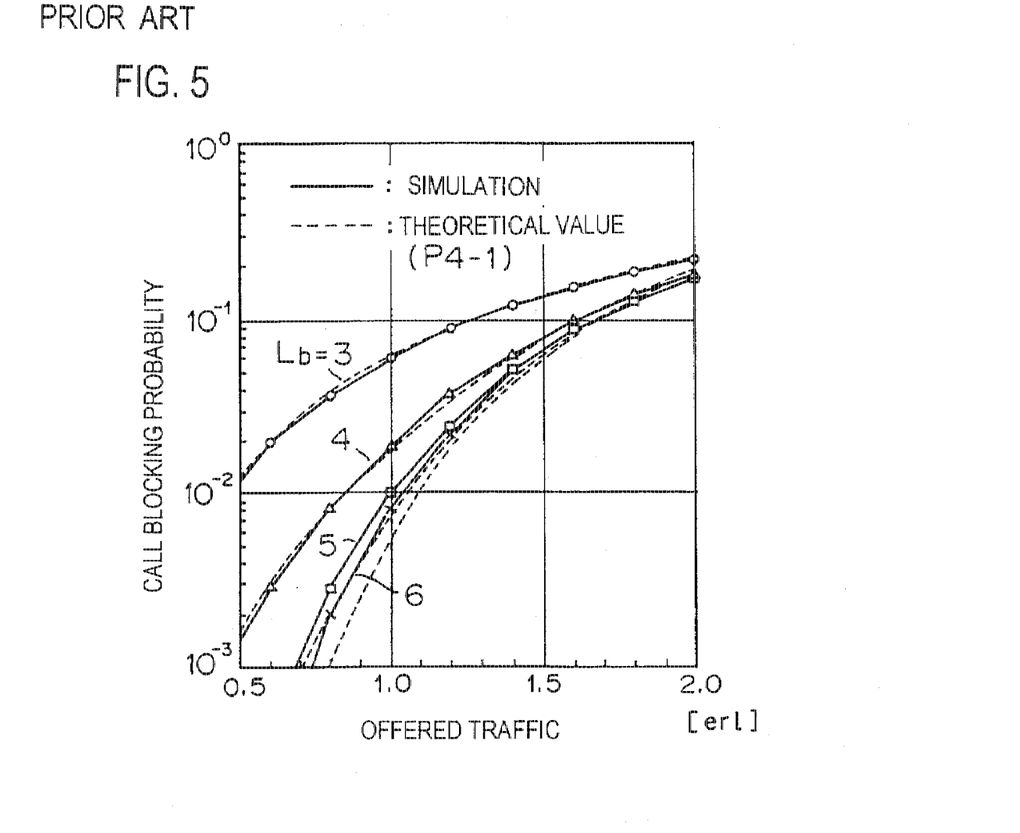
FIG. 5 is a graph showing a call blocking probability characteristic in the prior art.

It is considered that the channel segregation pattern depicted in FIG. 4A is approximately a combination of three kinds of basic patterns shown in FIGS. 4B, 4C and 4D. These basic patterns are two kinds of four-cell reuse patterns P4-1 and P4-2 and a five-cell reuse pattern P5. The relationship between call blocking probability and offered traffic (traffic volume) in this case is such as shown in FIG. 5. The solid-line curves indicate call blocking probability performance when the number $L_b$ of transmitter-receivers provided in each base station was 3, 4, 5 and 6, respectively; it is seen from the graph that the call blocking probability decreases with an increase in the number of transmitter-receivers but does not much decrease even when the number $L_b$ is larger than six. The broken-line curves indicate theoretical values, which are approximate values based on the assumption that the channel segregation could completely be accomplished by the highest-density packing based on the repetition of the pattern P4-1 depicted in FIG. 4B (Shin Koike and Hideaki Yoshino, "Traffic Analysis of Channel Segregation System in Mobile Communications," Transactions of the Institute of Electronics, Information and Communication Engineers of Japan, SSE93-1, April 1993).

With the channel segregation system described above, the four-cell reuse pattern shown in FIG. 4B or 4C is not orderly formed unlike in FIG. 4A, but instead complicated patterns are formed which includes such a five-cell reuse pattern as shown in FIG. 4D. The five-cell reuse pattern impairs the frequency utilization efficiency than does the four-cell reuse pattern, so that the call blocking probability also increases.

An object of the present invention is to provide a channel segregation method that permits the formation of a full convergence pattern of channel segregation, not such an incomplete convergence pattern as described above, and hence implements more efficient channel segregation.

DISCLOSURE OF THE INVENTION

The present invention is directed to a channel segregation method that utilizes the autonomous distributed control scheme and allows each base station to assign an idle channel of a predetermined number of channels to a call according to their priorities. The method comprises the steps of:

(a) presetting a first threshold value and a second larger threshold value with respect to the carrier power versus interference-wave power ratio CIR, defining a first range of the CIR value smaller than the first threshold value, a second range of the CIR value between the first and second threshold values and a third range of the CIR value larger than the second threshold value, and predetermining an increasing/decreasing function that takes at least a first value in the first CIR range and at least a second value opposite in polarity to the first value in the second CIR range;

(b) measuring the CIR value for each channel at every predetermined timing;

(c) when the measured CIR value is in the first CIR range, decreasing the priority of the channel by at least the value of the increasing/decreasing function corresponding to the first value;

(d) when the measured CIR value is in the second CIR range, increasing the priority of the channel by at least the value of the increasing/decreasing function corresponding to the second value;

(e) when the measured CIR value is in the third CIR range, maintaining the previous priority of the channel; and (f) when an idle channel is assigned to a call, increasing the priority of the assigned channel.

In the method of the present invention, it is also possible to measure the received power of an interference wave for each channel instead of measuring the CIR, in which case the received power is compared with its threshold values corresponding to the above-mentioned ones to determine the region where it is and the priority of the channel is controlled accordingly. In this instance, the larger the received power, the lower the CIR and the priority of the channel is controlled correspondingly.

Furthermore, it is also possible to change the priority by a linear recursive equation using a forgetting factor.

As described above, according to the present invention, the CIR range for increasing priority is defined adjacent the CIR range for decreasing priority; the two ranges coordinate to increase the channel priority in a cell adjacent the adjoining cell on the outside thereof, permitting the implementation of channel segregation with higher channel utilization efficiency than in the past.

BEST MODE FOR CARRYING OUT THE INVENTION

Figure 6A:
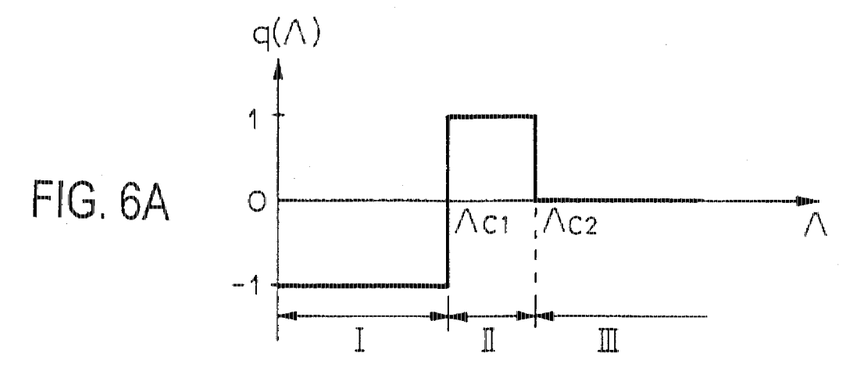
FIG. 6A is a graph showing an example of the priority increasing/decreassing function $q(\Lambda)$ for use in the present invention.

The channel segregation method according to the present invention is common to the prior art in including the CIR or interference power measuring step and the priority updating step but different in the process of scanning all idle channels and updating their priorities. FIG. 6A shows an example of the priority increasing/decreasing function $q(\Lambda)$ based on Eq. (1) in the present invention, and as referred to previously with respect to FIG. 3, the CIR value $\Lambda$ virtually corresponds to the distance to the source of interference. The prior art uses only one threshold value, i.e. $\Lambda_c$, but the present invention uses two or more threshold values. The CIR value $\Lambda$ is divided by such threshold values into three or more ranges and the priority increasing/decreasing function $q(\Lambda)$ has a different value corresponding to each CIR range.

Figure 7:
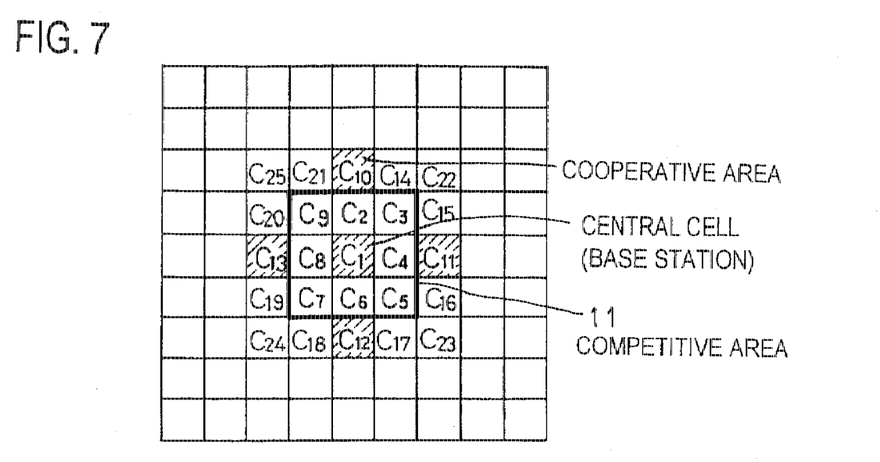
FIG. 7 is a diagram illustrating, by way of example, the cooperating area and a competitive area for segregation formation with respect to the central cell.

An embodiment of FIG. 6A uses two threshold values $\Lambda_{c1}$ and $\Lambda_{c2}$ (where $\Lambda_{c1} < \Lambda_{c2}$), by which the CIR vaLue $\Lambda$ is divided into three ranges I, II and III. The threshold value $\Lambda_{c1}$ is set to the same value as that $\Lambda_c$ of the increasing/decreasing function $q(\Lambda)$ in the prior art example of FIG. 3. In the range I below the threshold value $\Lambda_{c1}$, that is, the range that indicates the presence of interference waves to a noted cell $C_1$ from those $C_2$ to $C_9$ surrounding it, for example, as shown in FIG. 7 described later, $q(\Lambda) = -1$ is set in Eq. (1) as in the prior art. According to the present invention, however, in the range II that indicates the presence of interference waves from those of cells outside the cells $C_2$ to $C_9$ surrounding the noted cell $C_1$ whose distances (each corresponding to the CIR value or the reciprocal of the received level W) from the noted cell are within a predetermined value (corresponding to the CIR value $\Lambda$), such as cells $C_{10}$ to $C_{13}$, $q(\Lambda) = 1$ is set in Eq. (1) to increase priority. In the range III where the CIR value $\Lambda$ is larger than in the range II, $q(\Lambda) = 0$ is set to hold priority unchanged.

When a call occurs in the base station, it is assigned a channel of the highest priority and usable (that is, idle) channel, followed by updating the priority of the assigned channel by Eq. (4) as in the prior art.

Figure 6B:
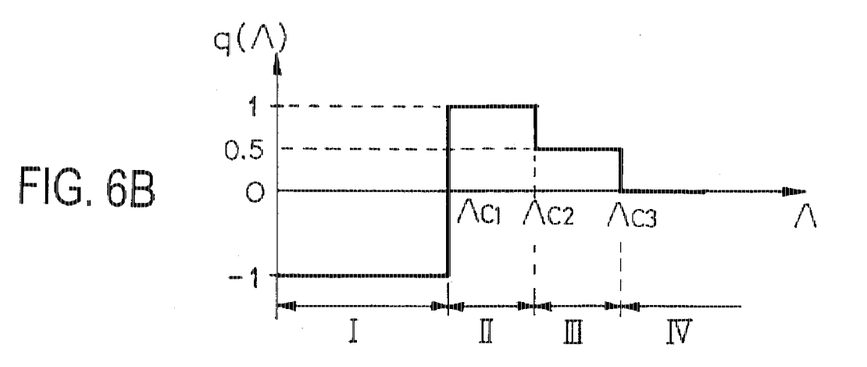
FIG. 6B is a graph showing another example of the priority increasing/decreasing function $q(\Lambda)$ for use in the present invention.

An embodiment of FIG. 6B uses three threshold values $\Lambda_{c1}$, $\Lambda_{c2}$ and $\Lambda_{c3}$ (where $\Lambda_{c1} < \Lambda_{c2} < \Lambda_{c3}$) to divide the CIR vaIIue $\Lambda$ into four ranges I, II, III and IV. The updating in the ranges I and II is performed in the same manner as in the ranges I and II in the FIG. 6A embodiment; in the range III, the function $q(\Lambda)$ in Eq. (1) is set to a smaller positive value (0.5 in FIG. 6B) than in the case of range II; and in the range IV, the function $q(\Lambda)$ is set to zero. When the CIR value $\Lambda$ in the channel $CH^k$ is within the range III, it indicates the presence of interference waves, for example, in FIG. 7, to the noted cell $C_1$ from cells $C_{14}$ to $C_{21}$ which are adjacent the cells $C_2$ to $C_9$ on the outside thereof and distant from the noted cell in excess of the distance corresponding to threshold value $\Lambda_{c2}$ defined in FIG. 6A; in this instance, the priority on the channel $CH^k$ in the base station of the cell $C_1$ is updated setting $q(L) = 0.5$ in Eq. (1). As the result of this processing, the priority on the channel $CH^k$ in the cells $C_{14}$ to $C_{21}$ where sources of interference are present is increased but less than that in cells $C_{10}$ to $C_{13}$.

Figure 6C:
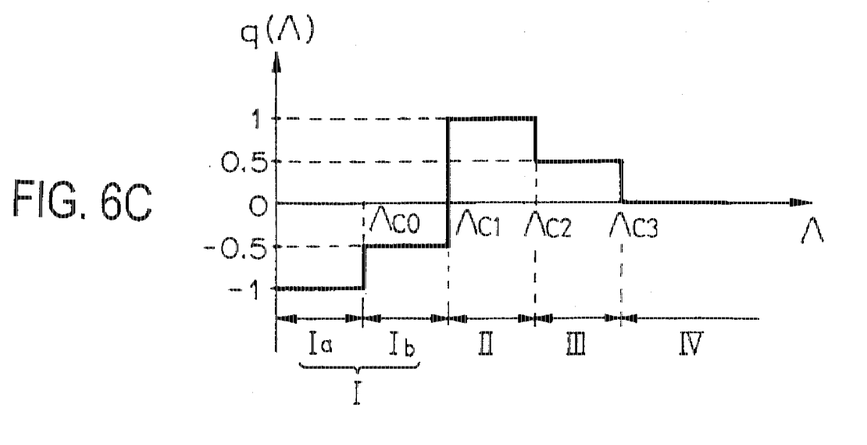
FIG. 6C is a graph showing still another example of the priority increasing/decreasing function $q(\Lambda)$ for use in the present invention.

FIG. 6C shows the case where the range I is subdivided into two ranges Ia and Ib, using a threshold value $\Lambda_{c0}$ smaller than that $\Lambda_{c1}$. In the range Ia where the CIR value $\Lambda$ is below the threshold value $\Lambda_{c0}$, the function $q(\Lambda)$ is set to $-1$, and in the range Ib where $\Lambda_{c0} < \Lambda < \Lambda_{c1}$, the function $q(\Lambda)$ is set to $-0.5$, a negative value smaller in absolute value than the function in the range Ia. According to this embodiment, by a suitable selection of the threshold value $\Lambda_{c0}$, the CIR value $\Lambda$ by interference waves from the adjacent cells $C_2$, $C_4$, $C_6$ and $C_8$ closer to the noted cell $C_1$ in FIG. 7 is detected more in the range Ia and the CIR value $\Lambda$ by interference waves from the adjacent cells $C_3$, $C_5$, $C_7$ and $C_9$ farther than the above-mentioned is detected more in the range Ib. As a result, even the adjacent cells are allowed to change the priority on the same channel according to the distance from the noted cell. As described above, various values can be used for the function $q(\Lambda)$. The use of such an increasing/decreasing function brings about not only a function of reducing channel contention among the adjacent cells but also a function of performing the channel assignment in a coordinated fashion among cells distant from the noted cell. These new functions will be described below in detail.

FIG. 7 illustrates, for the sake of brevity, a service area with square cells positioned therein, for explaining the priority updating operation that takes place during the scanning of idle channels in the channel segregation method of the present invention. Suppose that the base station $B_1$ is placed in the center cell $C_1$. Furthermore, assume that the increasing/decreasing function $q(\Lambda)$ has such a characteristic as shown in FIG. 6A. Since radio waves from the base station $B_1$ reach the cells $C_2$ to $C_9$ surrounding the cell $C_1$. Let it be assumed that the CIR value is below the threshold value $\Lambda_{c1}$ when measured in the adjacent cells $C_2$ to $C_9$. Accordingly, these cells $C_2$ to $C_9$ are cimpetitive to the cell $C_1$ for each channel $CH^k$. Hence, a cell 11 where interference waves below the threshold value $\Lambda_{c1}$ are generated will hereinafter be referred to as a competitive area. In the contention cell 11, as the priorities of the channels $CH^1$ to $CH^k$ are updated after a certain elapsed time, the segregation pattern for channels converges. This phenomenon is caused by the same operation as in the case of using the conventional method.

When interference waves from those $C_{10}$ to $C_{13}$ of the cells $C_{10}$ to $C_{25}$ adjacent the cells $C_2$ to $C_9$ on the outside thereof which are closer to the noted cell $C_1$ than the others are received by the base station of the cell $C_1$ in the channel $CH^k$, the CIR value $\Lambda$ calculated from the received interference waves becomes the value in the range II in FIG. 6A. Hence, the priority of the channel $CH^k$ is updated to increase using Eq. (4). As the result of this, the frequency of use of the channel $CH^k$ in the cell $C_1$ goes up. When the channels $CH^k$ is used in the cell $C_1$, the CIR value $\Lambda$ of the channel $CH^k$ in the cells $C_{10}$ to $C_{13}$ enters the range II, with the result that the frequency of use of that channel goes up through cooperation between the cells $C_{10}$ to $C_{13}$ and the cell $C_1$. Since these cells $C_{10}$ to $C_{13}$ bear such a cooperative relationship, their zones will hereinafter be referred to as cooperative area. On the other hand, in the cells $C_2$ to $C_9$ the frequency of use of the channel $CH^k$ goes down.

When an interference wave from at least one of the cells $C_{14}$ to $C_{25}$ and cells farther from the cell $C_1$ than them is received in the cell $C_1$ in the channel $CH^k$, the CIR value $\Lambda$ calculated from the received interference wave is a value in the range III in FIG. 6A. In this range, the function $q(\Lambda)$ is set to zero as in the prior art example of FIG. 3, so that the priority of the channel $CH^k$ in the cell $C_1$ is not updated and is held at the value at the immediately preceding time (i-1).

Figure 8:
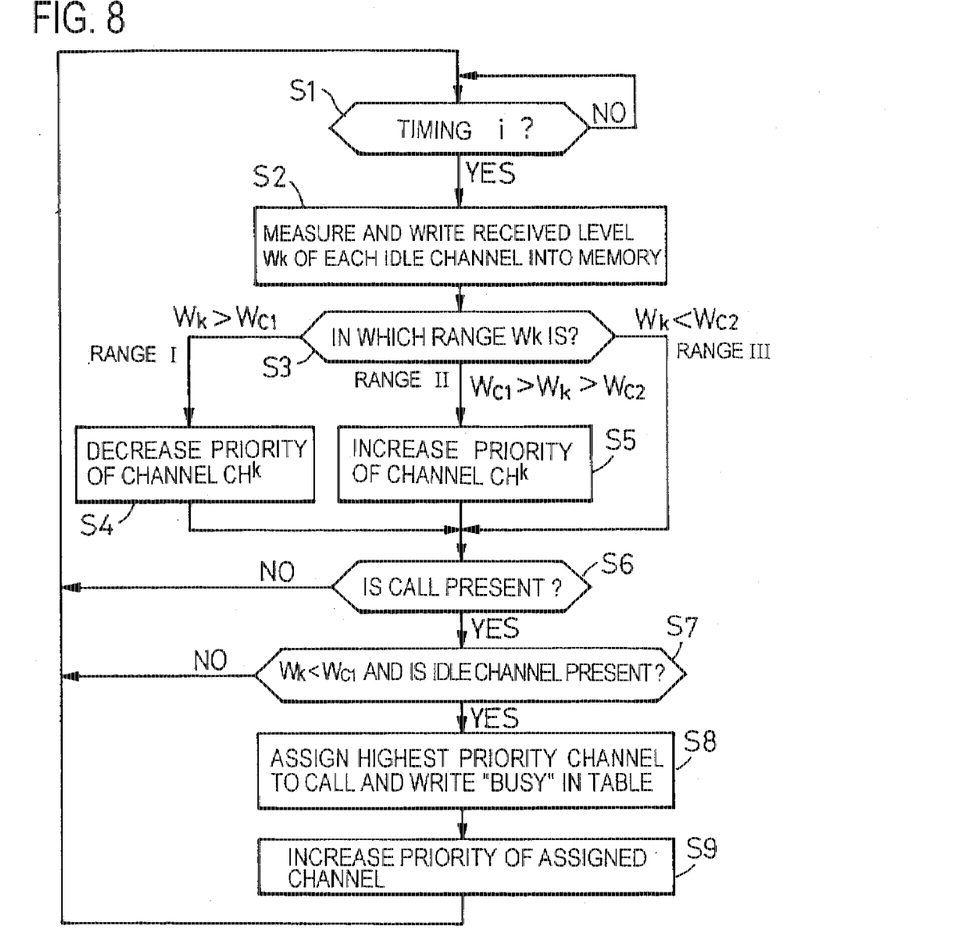
FIG. 8 is a flowchart showing the procedure for simulating the method of the present invention.
Figure 9:
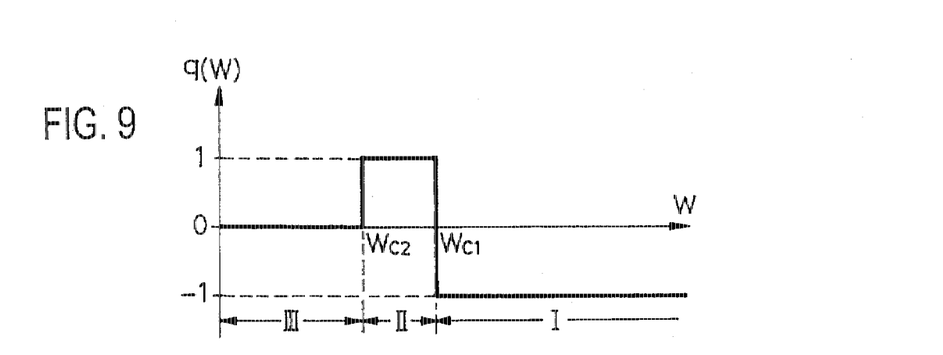
FIG. 9 is a graph showing an increasing/decreasing function $q(W)$ that represents the increasing/decreasing function of FIG. 6A as received power W.

Since the present invention introduces cooperation as well as competition among the cells as described above, the convergence pattern for channel segregation becomes more complete. To check this convergence, computer simulations were carried out on the channel segregation using the increasing/decreasing function $q(\Lambda)$ in FIG. 6A. The procedure used therefor is shown in FIG. 8. In the following description, the CIR value of each channel $CH^k$ will be replaced by the entire power, $W_k=\alpha/\Lambda$ where $\alpha$ is a constant, received from the other cells (the power of received interference waves) in the channel $CH^k$. Accordingly, a function $q(W)$ shown in FIG. 9 will be used in place of the priority increasing/decreasing function $q(\Lambda)$ in FIG. 6A. Since the level ratio between a desired wave in the noted cell and an interference wave from an external cell, that is, the CIR value $\Lambda$, and the interference wave level W bear a reciprocal relationship, their magnitudes are reverse from each other. The simulation of channel segregation was done following the procedure depicted in FIG. 8.

In step S1 a check is made to see if timing i at regular interval time has been reached; if so, the received levels $W_k$ of the channels $CH^1$ to $CH^k$ are measured one after another in step S2. In this instance, the channel currently in use is skipped. The measured received levels $W_k$ are written into a memory in correspondence with the channels as shown in the table of FIG. 2.

In step S3, the measured received levels $W_k$ are each compared with the threshold values $W_{c1}$ and $W_{c2}$, whereby it is determined which of the ranges I to III the measured level belongs to. When $W_k>W_{c1}$, that is, when the measured level lies within the range I, the procedure goes to step S4, wherein the priority of the corresponding channel $CH^k$ is decreased by Eq. (2), thereby updating the corresponding priority in the table of FIG. 2. When $W_{c1}\geq W_k>W_{c2}$, that is, when the measured level lies within the range II, the procedure goes to step S5, wherein the priority of the corresponding channel is increased by Eq. (4), thereby updating the corresponding priority in the channel state table of FIG. 2. When $W_k<W_{c2}$, that is, when the measured level lies within the range III, the procedure proceeds to step S6 without updating priority.

In step S6, a check is made to see if a call is generated; if not, the procedure goes back to step S1 to wait for the next timing (i+1). When a call is generated in step S6, the procedure goes to step S7, wherein reference is made to the table of FIG. 2 to search for an idle channel whose received level $W_k$ is lower than the interference-level threshold value $W_{c1}$ (corresponding to the afore-mentioned threshold value $\Lambda_{c1}$) at which speech quality cannot be maintained. If no such a channel is found, the procedure goes back to step S1 after call blocking processing. When idle channels that satisfy the condition $W_k<W_{c1}$ are found, the procedure goes to step S8, wherein that one of the channels that has the highest priority is assigned to the call and it is written in the table of FIG. 2 that the channel is in use, followed by step S9 wherein the priority of the assigned channel in the table of FIG. 2 is updated, after which the procedure returns to step S1.

The procedure of FIG. 8 is intended to be merely illustrate the invention and can be modified variously. For example, while in the above the call processing after step S6 has been described to be performed upon each execution of steps S2 to S5 by the scanning of all idle channels, the call processing may also be performed halfway through the channel scanning according to the relationship between the time for measuring the received levels and the frequency of occurrence of the call. Moreover, since in mobile communications fading varies in a short time, there is a possibility that the call blocking probability is increased by determining the range in step S3 and the speech quality in step S7 ($W_k<W_{c1}$) through the measurement of the instantaneous CIR value $\Lambda$ (or received interference wave power W). To avoid this, it is also possible to hold in the table of FIG. 2 a predetermined number n of latest CIR values $\Lambda$ (or W) for each of the channels $CH^1$ to $CH^k$ so that an average value $\Lambda$ (or W) of a total of n+1 CIR values $\Lambda$ (or W) including the current one $\Lambda$ (or W) is used to determine the range and the speech quality.

When the lapse of time from the reference time 0 to the current one i is not so long, the priority appropriately change by each updating with Eq. (1); but when the value i is large, the magnitude of change of the priority by single updating decreases to a very small value q(Λ)/i as will be seen from such an approximate expression of Eq. (1) as follows:

$$P_m^k(i)=P_m^k(i+1)+q(\Lambda)/i$$

That is to say, when the channel segregation pattern has converged after a sufficiently long elapsed time, it is hard to adaptively correct or modify the channel segregation according to variations in the traffic distribution in the service area. This problem could be solved by using priority that is expressed by the following recursive equation, not by Eq. (1).

$$P_m^k(i)=\lambda P_m^k(i-1)+q(\Lambda) \qquad (5)$$

where λ is a forgetting coefficient and 1>λ>0. This scheme does not include such a division by the elapsed time i as in Eq. (1), and hence allows ease in the processing of a microprocessor or hardware-like arithmetic unit. Furthermore, Eq. (5) has a time constant τ=1/(1−λ) and the influence of further previous values becomes negligibly small. Hence, it is possible to control adaptively along various changes in the surrounding conditions. Incidentally, when a channel is assigned, the above-mentioned equation is used but q(Λ) is replaced with 1. In the range where q(L)=0, no updating of priority takes place; hence $P_m^k(i)=P_m^k(i-1)$.

Figure 10A:
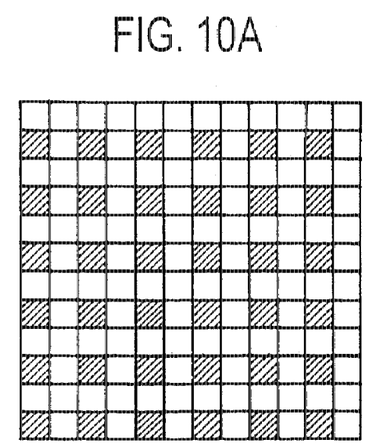
FIG. 10A is a diagram showing an example of a channel segregation convergence pattern in the case of the increasing/decreasing function of FIG. 9 being used.
Figure 10B:
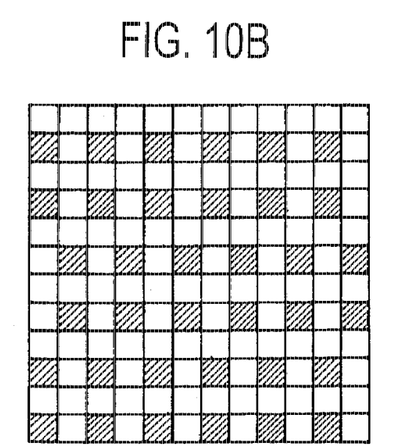
FIG. 10B is a diagram showing another example of the channel segregation convergence pattern in the case of the increasing/decreasing function of FIG. 9 being used.

In FIGS. 10A and 10B there are shown channel segregation convergence patterns obtained in the above-described simulations. The number of channels used and the conditions of the range over which interference waves reach are the same as those in the case of FIG. 4A. Each channel converged into either one of a pattern composed of only the basic patterns P4-1 as shown in FIG. 10A and a pattern composed of a combination of the basic patterns P4-1 and P4-2 as shown in FIG. 10B.

Figure 11:
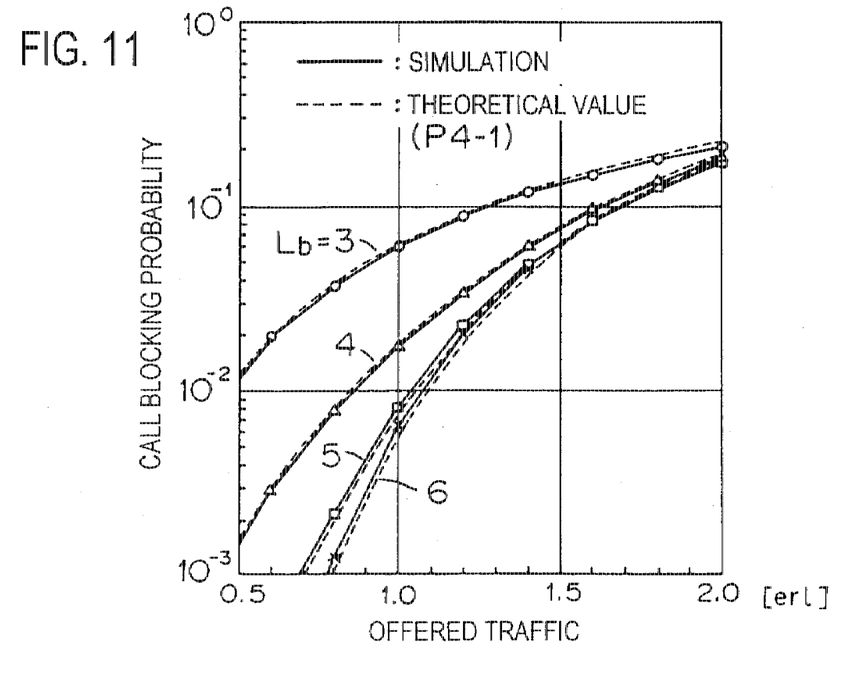
FIG. 11 is a graph showing call blocking probability performance obtained by simulations on the channel segregation using the increasing/decreasing function of FIG. 9.

It is by the introduction of cooperation as well as competition that provided such a convergence pattern approximate to the complete pattern composed of only the basic pattern P4-1. In FIG. 11 there are shown the call blocking probability characteristics obtained in the simulations. As will be seen from FIG. 11, results very close to theoretical values were obtained and even when the number of simultaneously usable channels (the number of transmitter-receivers) $L_b$ was large, a performance very close to the theoretical value was obtained; furthermore, it will be appreciated that the call blocking probability is lower than that of the prior art example of FIG. 5.

While the above simulations were done with the priority increasing/decreasing function q(Λ) set as shown in FIG. 6A, it is expected that the same results could be obtained even if the function is set as depicted in FIGS. 6B and 6C. These increasing/decreasing functions q(Λ) have been described to take a value +1 or smaller positive value when to increase the priority and a value −1 or smaller magnitude negative value when to decrease the priority, but these values were used merely for convenience of explanation and they can be freely determined according to the average frequency of occurrence of the call and the desired channel segregation speed.

As described above, the present invention permits efficient channel segregation through introduction of the cooperation operation. With the high efficiency segregation scheme, it is possible to expect that the system performance would be enhanced in various aspects such as the reduction of the loss probability and the reduction of the frequency of channel switching.

I claim:

1. A channel segregation method which utilizes an autonomous distributed control scheme and allows each base station to assign an idle channel of a predetermined number of channels to a call according to their priorities, said method comprising the steps of:

(a) presetting a first threshold value and a second larger threshold value with respect to a carrier power versus interference-wave power ratio CIR, defining a first range of said CIR value smaller than said first threshold value, a second range of said CIR value between said first and second threshold values and a third range of said CIR value larger than said second threshold value, and predetermining an increasing/decreasing function which takes at least a first value in said first CIR range and at least a second value opposite in polarity to said first value in said second CIR range;

(b) measuring said CIR value for each channel at every predetermining timing;

(c) when said CIR value is within said first CIR range, decreasing the priority of said channel by at least the value of said increasing/decreasing function corresponding to said first value;

(d) when said measured CIR value is within said second CIR range, increasing the priority of said channel by at least the value of said increasing/decreasing function corresponding to said second value;

(e) when said measured CIR value is within said third CIR range, maintaining the previous priority of said channel unchanged; and (f) when said idle channel is assigned to said call on the basis of the priority of said each channel, increasing the priority of said assigned channel.

2. The channel segregation method of claim 1 wherein: a third threshold value is predetermined intermediate between said first and second threshold values; said second range includes a fourth range defined between said first and third threshold values and a fifth range defined between said third and second threshold values; said increasing/decreasing function takes said second value in said fourth range and, in said fifth range, at least a third value smaller in absolute value than said second value and common thereto in polarity; and said step (d) is a step of increasing the priority of said channel by the value corresponding to said second or third value of said increasing/decreasing function, depending on whether said measured CIR value is within said fourth or fifth range.

3. The channel segregation method of claim 1 wherein: a third threshold value smaller than said first threshold value is predetermined in said first range; said first range includes a fourth range below said third threshold value and a fifth range defined between said third and first threshold values; said increasing/decreasing function takes said second value in said fourth range and, in said fifth range, a third value smaller in absolute value than said second value and common thereto in polarity; and said step (c) is a step of decreasing the priority of said channel by the value corresponding to said second or third value of said increasing/decreasing function, depending on whether said measured CIR value is within said fourth or fifth range.

4. The channel segregation method of claim 1, 2, or 3 wherein, letting the current timing, said measured CIR value and said increasing/decreasing function be represented by i, Λ and q(Λ), respectively, said priority of said each channel is expressed by the following equation:

$$P(i)=\{(i-1)P(i)+q(\Lambda)\}/i.$$

5. The channel segregation method of claim 1, 2, or 3 wherein, letting the current timing, said measured CIR value and said increasing/decreasing function be represented by i, Λ and q(Λ), respectively, said priority of said each channel is expressed by the following equation:

$$P(i)=\lambda P(i-1)+q(\Lambda)$$

where λ is a predetermined forgetting coefficient that satisfies a condition 1>λ>0.

6. A channel segregation method which utilizes an autonomous distributed control scheme and allows each base station to assign an idle channel of a predetermined number of channels to a call according to their priorities, said method comprising the steps of:
- (a) presetting a first threshold value and a second smaller threshold value with respect to interference-wave received power, defining a first range of said interference-wave received power larger than said first threshold value, a second range of said interference-wave received power between said first and second threshold value and a third range of said interference-wave received power smaller than said second threshold value, and predetermining an increasing/decreasing function that takes at least a first value in said first range and at least a second value opposite in polarity to said first value in said second range;
- (b) measuring said interference-wave received power for each channel at every predetermined timing;
- (c) when said measured interference-wave received power is within said first range, decreasing the priority of said channel by at least the value of said increasing/increasing function corresponding to said first value;
- (d) when said measured interference-wave received power is within said second range, increasing the priority of said channel by at least the value of said increasing/decreasing function corresponding to said second value;
- (e) when said measured interference-wave received power is within said third range, maintaining the previous priority of said channel unchanged; and
- (f) when said idle channel is assigned to said call on the basis of said priority of said each channel, increasing the priority of said assigned channel.

7. The channel segregation method of claim 6 wherein: a third threshold value is predetermined intermediate between said first and second threshold values; said second range includes a fourth range defined between said first and third threshold values and a fifth range defined between said third and second threshold values; and said increasing/decreasing function takes said second value in said fourth range and, in said fifth range, at least a third value smaller in absolute value than said second value and common thereto in polarity; and said step (d) is a step of increasing the priority of said channel by the value corresponding to said second or third value of said increasing/decreasing function, depending on whether said measured interference-wave received power is within said fourth or fifth range.

8. The channel segregation method of claim 6 wherein: a third threshold value larger than said first threshold value is predetermined in said first range; said first range includes a fourth range above said third threshold value and a fifth range defined between said third and first threshold values; said increasing/decreasing function takes said second value in said fourth range and, in said fifth range, a third value smaller in absolute value than said second value and common thereto in polarity; and said step (c) is a step of decreasing the priority of said channel by the value corresponding to said second or third value of said increasing/decreasing function, depending on whether said measured interference-wave received power is within said fourth or fifth range.

9. The channel segregation method of claim 6, 7, or 8 wherein, letting the current timing, said measured interference-wave received power and said increasing/decreasing function be represented by i, W and q(W), respectively, said priority of said each channel is expressed by the following equation:

$$P(i)=\{(i-1)P(i)+q(W)\}/i.$$

10. The channel segregation method of claim 6, 7, or 8 wherein, letting the current timing, said measured interference-wave received power and said increasing/decreasing function be represented by i, W and q(W), respectively, said priority of said each channel is expressed by the following equation:

$$P(i)=\lambda P(i-1)+q(W)$$

where λ is a predetermined forgetting coefficient that satisfies a condition 1>λ>0.

* * * * *